US008327335B2

(12) United States Patent
Noble et al.

(10) Patent No.: US 8,327,335 B2
(45) Date of Patent: Dec. 4, 2012

(54) PERFORMANCE MANAGEMENT TOOL HAVING UNIFIED ANALYSIS REPORT

(75) Inventors: William Noble, South Lyon, MI (US);
Rosina M. Beadle, Canton, MI (US);
Terrence V. Harshfield, Novi, MI (US);
Kristen Allmacher, Livonia, MI (US);
Jerry Amos Dunst, Southfield, MI (US);
Bryce Dunn, Royal Oak, MI (US);
Sithanshu K. Shashidhara, Novi, MI (US); Bartosz Gatz, Straszyn (PL);
Krzysztof Ziemianowicz, Gdynia (PL)

(73) Assignee: Compuware Corporation, Detroit, MI (US)

( * ) Notice: Subject to any disclaimer, the term of this patent is extended or adjusted under 35 U.S.C. 154(b) by 633 days.

(21) Appl. No.: 12/552,351

(22) Filed: Sep. 2, 2009

(65) Prior Publication Data
US 2011/0055817 A1    Mar. 3, 2011

(51) Int. Cl.
*G06F 9/44* (2006.01)
*G06F 11/00* (2006.01)
*G06F 15/173* (2006.01)
(52) U.S. Cl. ......... 717/127; 717/131; 714/37; 714/38.1; 714/39; 709/223; 709/224; 709/225; 709/226; 702/119
(58) Field of Classification Search .................. None
See application file for complete search history.

(56) References Cited

U.S. PATENT DOCUMENTS

| 7,818,246 | B2 * | 10/2010 | Cushing et al. | 705/37 |
|---|---|---|---|---|
| 7,974,849 | B1 * | 7/2011 | Begole et al. | 705/1.1 |
| 7,996,814 | B1 * | 8/2011 | Qureshi et al. | 717/120 |
| 8,146,103 | B2 * | 3/2012 | Schmidt et al. | 719/318 |
| 2004/0064293 | A1 * | 4/2004 | Hamilton et al. | 702/182 |
| 2005/0206644 | A1 * | 9/2005 | Kincaid | 345/440 |
| 2006/0123389 | A1 * | 6/2006 | Kolawa et al. | 717/101 |
| 2006/0146053 | A1 * | 7/2006 | Gatewood et al. | 345/440 |
| 2006/0259394 | A1 * | 11/2006 | Cushing et al. | 705/37 |
| 2008/0195369 | A1 * | 8/2008 | Duyanovich et al. | 703/22 |
| 2008/0313596 | A1 * | 12/2008 | Kreamer et al. | 717/101 |
| 2009/0043621 | A1 * | 2/2009 | Kershaw | 705/7 |
| 2009/0281865 | A1 * | 11/2009 | Stoitsev | 705/9 |
| 2011/0255421 | A1 * | 10/2011 | Shrirang et al. | 370/244 |

* cited by examiner

*Primary Examiner* — Henry Tsai
*Assistant Examiner* — Michael Sun
(74) *Attorney, Agent, or Firm* — Harness, Dickey & Pierce, P.L.C.

(57) ABSTRACT

An improved method is provided for identifying a cause of a performance problem experienced by an application in a computing environment. To help a user find and isolate the problem quicker, the method proposes a unified performance analysis report that presents the most likely indicators of the source of the performance problem. The report presents performance metrics for the software services used by the application and charts the metric values over time since it is often the change in a metric that indicates a problem. Each metric chart should also include an indicator for the state of service for the application. This will help the user correlate metrics from multiple sources to the time period in which the application experienced a problem.

22 Claims, 8 Drawing Sheets

Unified Performance Analysis

| Hour | Day | Week | Month | ◇ Sun Jul 5 2009 10:00 - Mon Jul 6 2009 10:00 ( Previous 24 Hours ) ◇ | Summary Level: hourly ▽ |

Period Type: ● Calendar ○ Rolling

☑ Show service quality
☑ Show heat chart
☐ Show business calendar

☐ Show exceptions only
☐ Show warnings only
☐ Show thresholds
☐ Show events

Summary rows: 4
Summary columns: 3

Detail rows: 2
Detail columns: 3

Apply

PERFORMANCE MANAGEMENT TOOL HAVING UNIFIED ANALYSIS REPORT

FIELD

The present disclosure relates to a performance management tool having a unified analysis report.

BACKGROUND

Companies that have distributed or Web-based applications often have a variety of tools that collect data about the performance of these applications. Specifically, tools are used to measure the end-user response time of the applications, along with multiple metrics on the Web servers, application servers, databases, and the physical servers that host the applications or application components. Metric data collected includes CPU utilization, disk I/O rates, TCP transmission errors, etc. The challenge is that given an application performance problem perceived (or potentially perceived) by a user of an application, how can the cause of the problem be quickly identified given the potentially overwhelming amount of metric data that has been collected.

Performance management tools generally provide reports on the metrics being collected, but they do not automatically show the software services, metrics, hardware devices and other computing infrastructure related to the application experiencing a particular problem. The user is forced to manually sift through volumes of data with the required a prior knowledge of how the applications and services are related.

Therefore, it is desirable to provide an improved method for identifying a cause of a performance problem experienced by an application in a computing environment. To help the user find and isolate the problem quicker, the method proposes a unified performance analysis report that presents the most likely indicators of the source of the performance problem. The report should show not only the current value of the metrics for the software services used by the application, but also a chart of the metric values over time since it is often the change in a metric that indicates a problem. In order to see more data at one time, each metric chart should show multiple software services that have that type of metric. This will help to address the situation where a company has, for example, 100 servers with 10 metrics each. Each metric chart should also include an indicator for the state of service for the application. This will help the user correlate metrics from multiple sources to the time period in which the application experienced a problem. The state of service indicator for the application may be displayed in a heat chart format along with the metric charts.

This section provides background information related to the present disclosure which is not necessarily prior art

SUMMARY

An improved method is provided for identifying a cause of a performance problem experienced by an application in a computing environment. The method includes: identifying software services that support an application experiencing a performance problem; grouping the identified software services into groups of services having a similar service type; for each group of services, identifying performance metrics associated with the software services in the respective group and grouping the identified performance metrics into groups of metrics having a similar data type; selecting a subset of groupings from the groups of metrics, where the groupings in the subset have performance metrics with the lowest service quality indicators; and displaying a chart for each group of metrics in the subset of groupings on a display device, where each chart plots the performance metrics contained in a respective group of metrics in relation to a time axis of the chart.

In another aspect of this disclosure, an improved performance management tool is provided that monitors performance of software applications in a computing environment. The performance management tool includes: a service model that maps each software application in the computing environment to respective computing infrastructure that supports the software application and a service manager configured to detect a change in a state of service provided by a given software application along with a time at which the change occurred and generate a report for the given software application using the service model. Each graph in the report depicts a metric over a period of time and an indicator for the state of service associated with the given software application shown in relation to a time axis of the graph, where the metric provides a basis for the state of service associated with the given software application and the time period includes the time at which the change in the state of service occurred.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
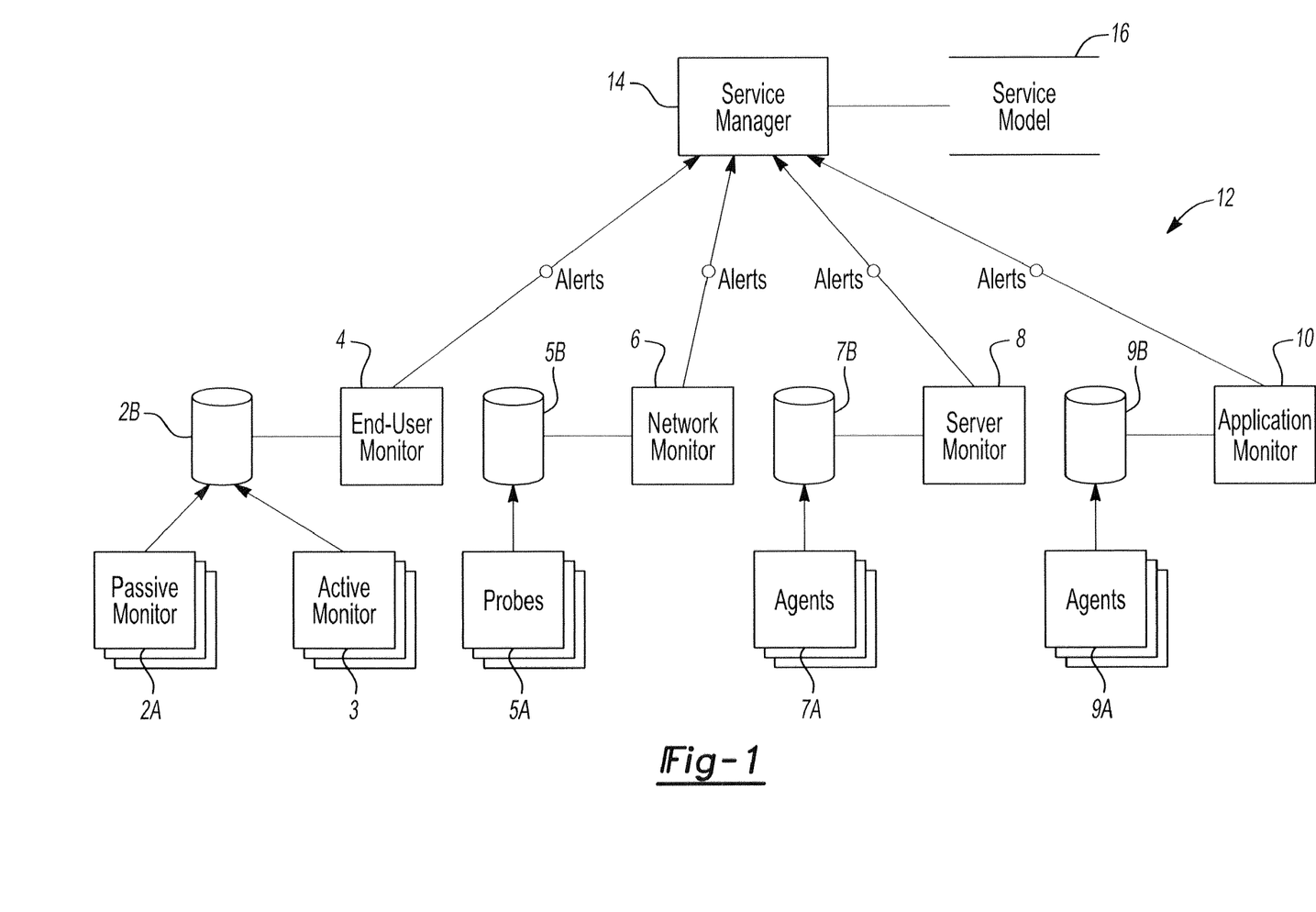
FIG. 1 is a diagram depicting an exemplary performance monitoring tool.

FIG. 1 depicts an exemplary performance management tool 12 that monitors performance of software applications in a computing environment. The performance management tool may be comprised generally of a service manager 14, a service model 16, and a plurality of different monitoring tools 18. The performance management tool 12 may include other components. The Vantage software product commercially available from Compuware Corporation is an exemplary performance management tool. While the following description is provided with reference to the Vantage software product and accompanying software offerings, it is readily understood that the teachings of this disclosure are applicable to other performance management tools, such as Foglight from Quest Software and ITCAM from IBM. Moreover, it is understood that the Vantage software product may be interfaced with monitoring tools from other third party vendors.

The service manager 14 processes and distills data from disparate sources to present real-time view of quality and performance of software applications which comprise an enterprise's computing environment. Data may be gathered using different types of monitoring tools 18 as will be further described below. The service manager 14 relies upon a service model 16 residing in a data store to understand the relationship between the data and a given application. More specifically, the service model 16 is a data structure that maps each software application in the computing environment to the respective computing infrastructure that supports the software application. The service manager 14 then uses a dashboard concept to present service quality and performance indicators on a graphical user interface for each of the applications being monitored.

End-user monitoring may be accomplished using one of two methods. Agentless monitoring measures application response times experienced by each user of an application as well as other related performance metrics. In this approach, monitoring software 2A passively collects data anywhere in the network from one or more centralized locations. In other words, the monitoring software does not reside on the end-users computing device. The monitoring software 2A in turn stores the collected data in a database 2B associated with the tool. Such end-user monitoring software is available with the Vantage product offering.

Active monitoring gauges response times for applications using monitoring software that typically resides on the end-users computing device or a dedicated workstation. The monitoring software 3 simulates user experiences using synthetic transactions, thereby providing "control" measurements that are especially important for assuring performance when actual usage is low. Likewise, the collected data may be stored in database 2B for subsequent reporting and analysis. The ClientVantage software available with the Vantage product offering is an example of this type of monitoring tool.

Network monitoring tools monitor traffic on an enterprise's network. Network probes 5A are placed at different locations in the network. Each probe is a software component that passively collects data which may be used to derive performance metrics such as network throughput, bandwidth utilization, total bytes sent, server response time, etc. Other network performance related metrics are also contemplated by this disclosure. The collected data is then stored in a database 5B. The network monitoring tool may further include a software analysis component 6 that analyzes and compiles the data for subsequent reporting. The NetworkVantage software available with the Vantage product offering is an example of this type of monitoring tool.

Server monitoring tools monitor metrics for physical servers (i.e., the hardware). Software agents 7A are placed on each of the devices being monitored. The software agents 7A collect data which may be used to derive performance metrics such as CPU utilization, memory utilization, disk space availability and other server related performance metrics. The collected data is then stored in a database 7B. The server monitoring tool may further include a software analysis component 8 that analyzes and compiles the data for subsequent reporting. The ServerVantage software available with the Vantage product offering is an example of this type of monitoring tool. Microsoft's Operations Manager is a comparable server monitoring tool.

Application performance monitoring tools monitor the performance and service availability of software applications running on physical servers. Software agents 9A are placed on the physical servers which host the software applications. The software agents 9A collect data which may be used to derive performance metrics including CPU utilization by an application, memory utilization by an application or other application related performance metrics. The collected data is then stored in a database 9B. The application performance monitoring tool may further include a software analysis component 10 that analyzes and compiles the data for subsequent reporting. The VantageAnalyzer software available with the Vantage product offering is an example of this type of monitoring tool. Computer Associates' Wily Customer Experience Manager is a comparable application performance monitoring tool.

Figure 2:
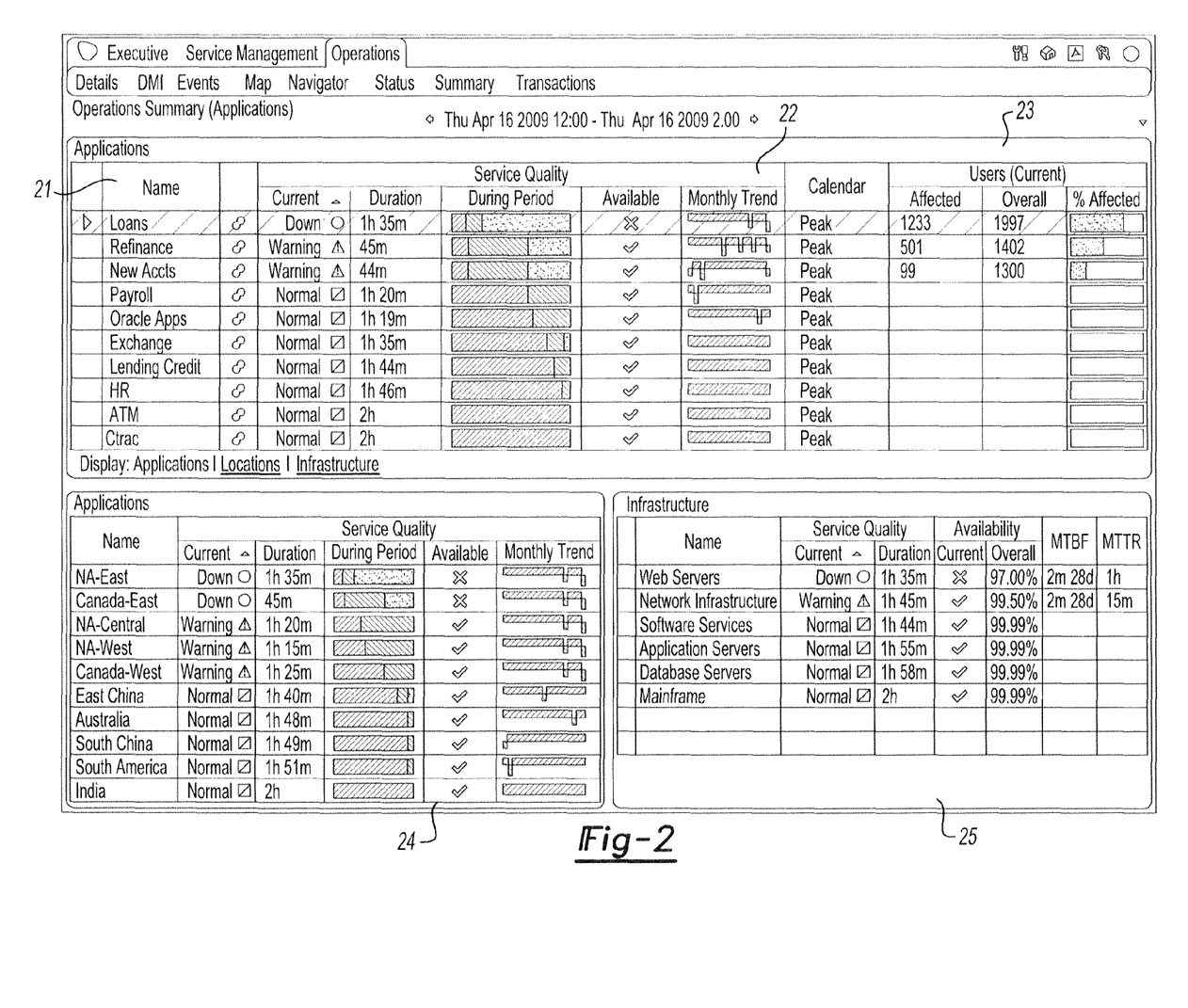
FIG. 2 depicts an exemplary operations overview interface from a performance management tool.

FIG. 2 depicts an exemplary operations overview interface 20 from a performance management tool. In this example, the operations overview interface 20 presents service quality and performance indicators in real-time for each of the applications being monitored by the user. The names of the applications 21, along with various performance indicators 22, are listed in the top panel 23 of the interface. Additional panels may be used to present service quality indicators for different geographic locations 24 and/or different types of computing infrastructure 25.

One of the service quality indicators is the current state of service provided by the application. Applications that are not currently experiencing any problems may have a normal state of service, such as the payroll application. When an application experiences a performance problem, the current state of service indicator will change states. For example, the current state of service indicator may indicate a warning condition as in the case of the refinance application or a non-operational (or down) condition as in the case of the loan applications. Presented with this type of information, users can initiate an investigation into the source of the problem.

Figure 3:
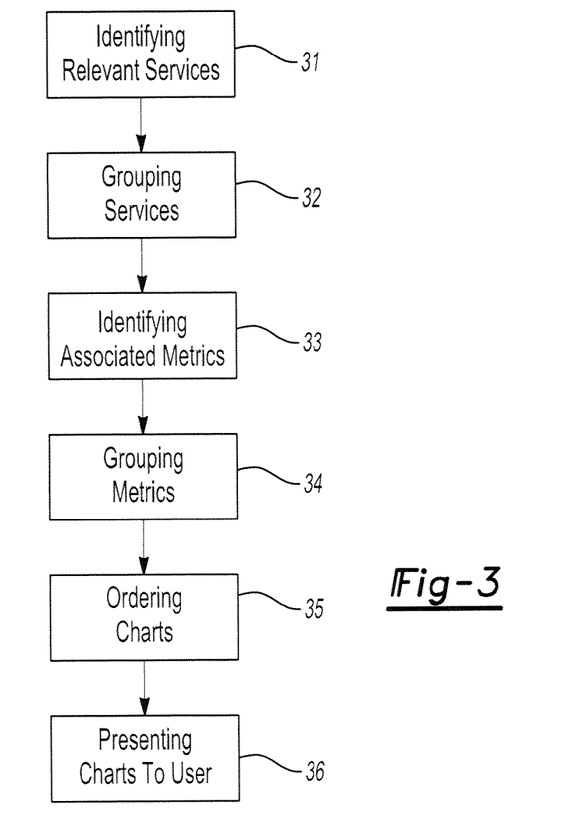
FIG. 3 is a flowchart illustrating an exemplary method for identifying a cause of a performance problem experienced by an application.

An exemplary method for identifying a cause of a performance problem experienced by an application in a computing environment is depicted in FIG. 3. The user's first goal is to quickly understand why a given application is experiencing a problem, and the second goal is to determine how to resolve the problem. To help the user understand the cause of the problem for a given application, the user should be presented as much information about the data being collected for the application as feasible. This data includes any metrics that are relevant to the understanding of the service quality issues. It is to be understood that only the relevant steps of the methodology are discussed in relation to FIG. 3, but that other software-implemented instructions may be needed to control and manage the overall operation of the tool.

To gather the pertinent data, each of the software services that support a given application are first identified at step 31. Software services can have an associated service type attribute which may be used to group similar services as well as a service quality attribute that includes a numerical value that can be used for comparison and ordering purposes. One or more performance metrics may also be associated with a given software service. Likewise, performance metrics can have an associated data type and a service quality attribute associated therewith.

Software services that support a given application are then grouped at step 32 into groups of services having a similar service type. For example, services classified as web servers may be grouped into one group and services classified as database servers may be grouped into another group. In an exemplary embodiment, software services having the same service type attribute are grouped together. Other techniques for grouping similar services are also contemplated.

For each group of services, performance metrics for each of the software services in a given group are identified at step 33. Within a given group of services, all of the identified performance metrics are grouped at step 34 into groups of metrics having similar data types. For example, it is understood that multiple web servers may be used to support a particular application. CPU utilization (a first exemplary performance metric) for each of the web servers that supports the application may be grouped into one group; whereas, percent of slow transactions (a second exemplary performance metric) from each of the web servers may be grouped into another group.

A chart for each group of metrics is then presented to the user at step 36. Each chart plots the performance metrics (or a subset thereof) contained in a respective group of metrics over time (i.e., in relation to a time axis) since it is often the change in a metric that indicates a problem. By plotting more than one performance metric on a single chart the user is presented with more data. On the other hand, a chart will be difficult to understand if too many metrics are presented. To address this concern, metrics in a given group may be ordered based upon their impact to the software service being monitored. For example, the metrics may be ordered by service quality from worst to best. Ordering metrics by other attributes is also contemplated by this disclosure. Only a predefined maximum number of the metrics (e.g., five) are then presented on a single chart. The number of metrics presented may be a user defined setting.

In an exemplary embodiment, the charts are displayed to the user as a graphical user interface on a display device. Since the number of charts that can be displayed on a single interface of the display is limited, charts are preferably ordered at step 35 based upon their impact to the application being monitored. Charts having metrics for the worst performing software services should bubble to the top of the order. Particular ordering schemes are described below. In this way, it is more likely that the software service causing the application problem will be displayed near the top of the interface as well as on the first page of a multiple page report.

Figure 4:
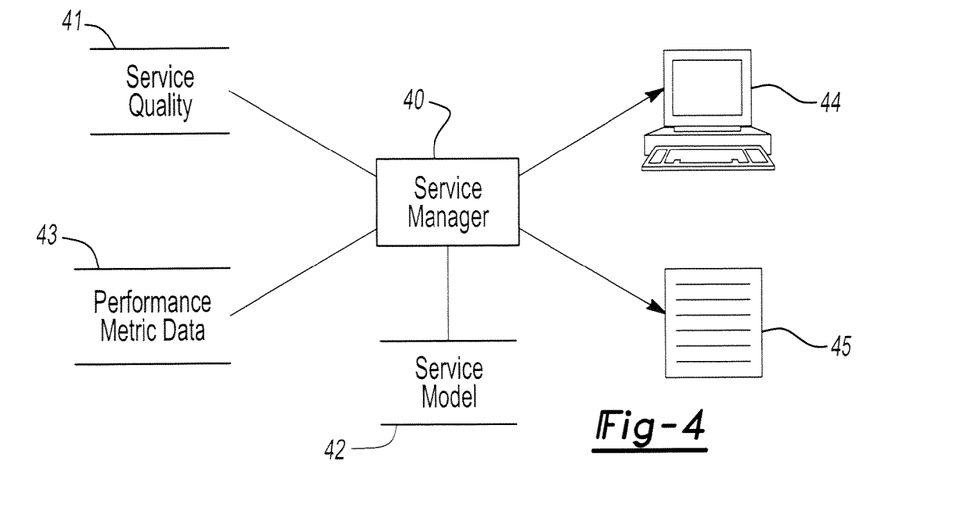
FIG. 4 is a diagram of a service manager in the context of a performance management tool.

With reference to FIG. 4, this exemplary method is preferably implemented by a service manager 40 in the context of a performance management tool. When operational, the service manager 40 monitors the state of service provided by the various software applications in an enterprise's computing environment. In a simplified example, the state of service provided by the applications of interest is maintained in a service quality data structure 41 which is periodically being updated by another component of the performance management tool. The service manager 40 accesses the service quality data structure 41. Upon detecting a change in the state of service provided by a given application, an indicia of the change is provided to user. For example, the current state of service indicator displayed on the operations overview interface will change as described above. In response to the indicia, the user may initiate an investigation into the problem by requesting the service manager 40 to generate a unified performance analysis report for the application experiencing a problem. Alternatively, the service manager 40 may generate the report automatically in response to the change in service state.

In an exemplary embodiment, the software services and associated performance metrics used to construct the unified analysis report are identified by the service manager 40 using a service model 42. While the exemplary embodiment relies upon a service model, it is readily understood that other means for associating software services with applications are within the broader aspects of this disclosure.

When constructing the unified performance analysis report, the service manager 40 retrieves data for each of the pertinent metrics from one or more additional data stores 43. The report is presented to the user as a graphical user interface on a display device 44. It is also envisioned that the report may be printed onto paper 45 or presented to the user using other medium types.

In an exemplary embodiment, the service manager 40 is implemented as one or more software modules (i.e., computer executable instructions) which reside in a memory and are executed by a processor of a computing device. The term module may also refer to an Application Specific Integrated Circuit (ASIC), an electronic circuit, a combinational logic circuit, and/or other suitable components that provide the described functionality.

Figure 5:
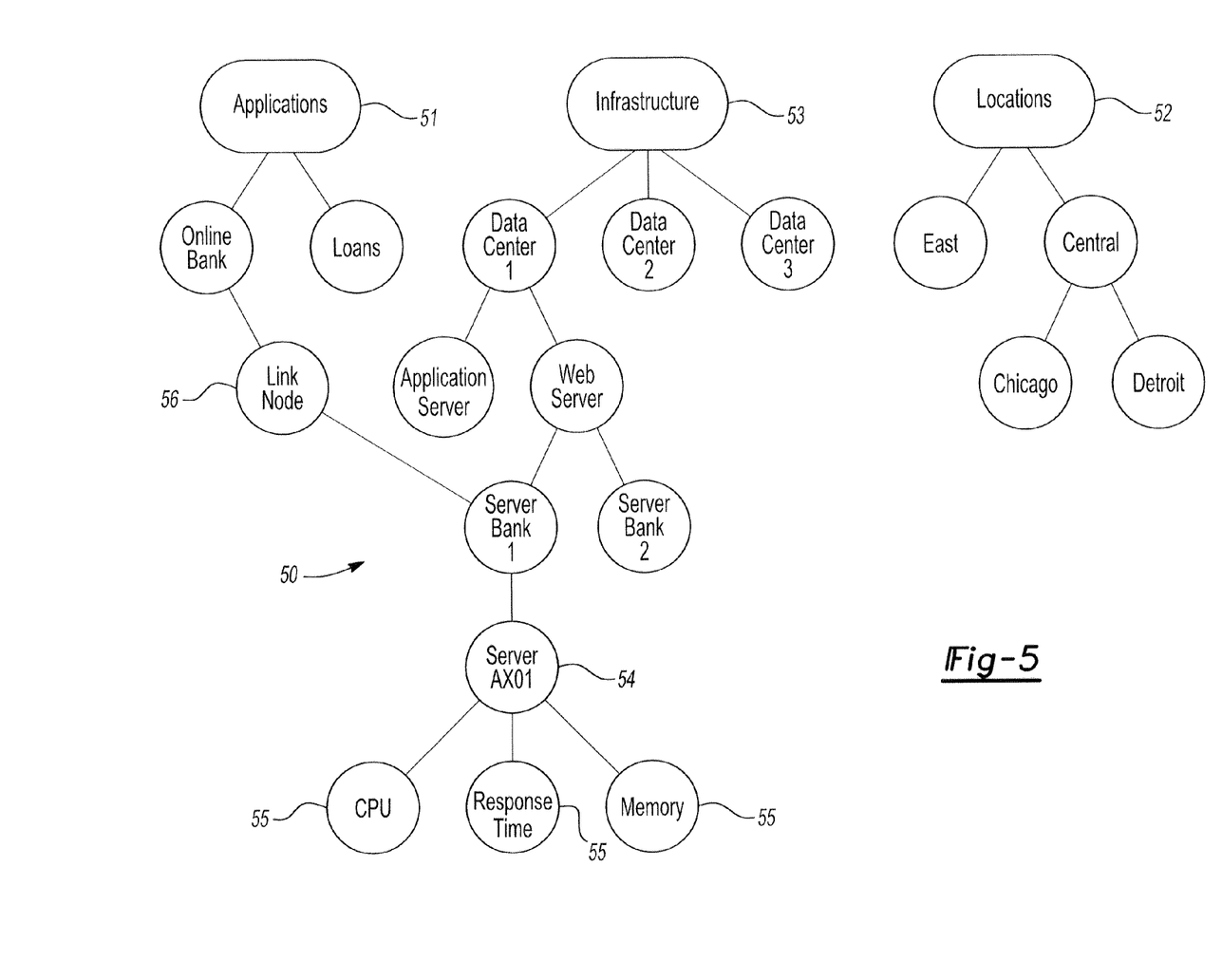
FIG. 5 is a diagram of an exemplary service model which may be employed by a performance management tool.

FIG. 5 illustrates an exemplary service model 50 which may be employed by a performance management tool. The service model 50 defines the relationship between entities in an enterprise's computing environment and, more particularly, links an enterprise's business services to the supporting information technology infrastructure. The service model 50 may be represented by a tree data structure. Other data structures for defining the service model are also within the broader aspects of this disclosure.

In an exemplary embodiment, the root nodes of the tree structure represent applications 51, the locations 52 of the users of the applications and the computing infrastructure 53 that supports the applications. The hierarchy for the branches extending from the root nodes may include more or less intermediate nodes depending upon the complexity and requirements of the enterprise. Other types of root nodes may also be included in the tree structure.

Branches extending from the application root node represent the hierarchy of application software with the leaf nodes representing the application software available to end users. Branches extending from the location root node represent the different geographical locations where the end users of the application software reside.

Branches extending from the infrastructure root node represent the hierarchy of computing components that comprise the computing environment, including web servers, application servers, databases, mainframe computers, network components, etc. Particular software services that support an application are defined at the tier immediately preceding the leaf nodes (i.e., parent nodes to the leaf nodes) indicated at 54. The leaf nodes 55 on the branches extending from the infrastructure root node represent the performance metrics associated with a particular software service and monitored by the performance management tool. An application infrastructure node designated at 56 is a particular type of intermediate link node that maps particular applications to the software services that support the particular application. These nodes are used identify the software services that support a particular application as further described below.

Figure 6:
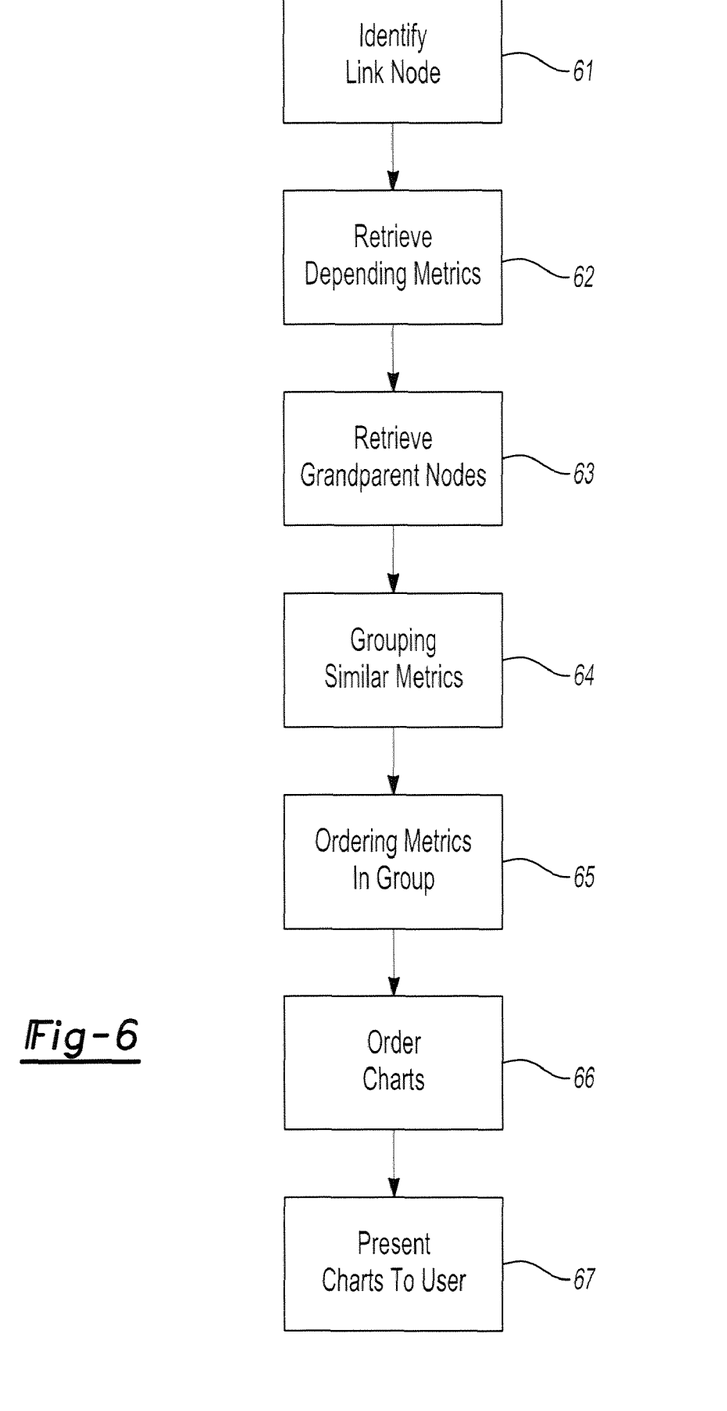
FIG. 6 is a flowchart illustrating a detailed approach for constructing a unified performance analysis report using the service model.

A more detailed approach for constructing a unified performance analysis report using the service model is described in relation to FIG. 6. For an application of interest, the application infrastructure node for the application is identified first at step 61 in the tree structure for the service model. From this node, all of the performance metrics associated with the application of interest can be retrieved at 62 using the service model. Performance metrics are retrieved by scanning downward each of the branches extending from the application infrastructure node to the leaf nodes.

To condense the data for presentation purposes, the performance metrics are then grouped. In the exemplary embodiment, the grandparent node (i.e., 2 tiers above) is retrieved at 63 for each retrieved leaf node. These nodes typically represent different types of software services in the service model and provide a logical grouping of the software service and therefore the metrics which depend from a given grandparent node. By selecting a tier from the bottom up, a logical grouping is achieved independent from how many tiers of hierarchy are between the root node and the leaf nodes.

Within each grouping of services, performance metrics having similar data types are further grouped at 64. More specifically, leaf nodes that depend from a given grandparent node are grouped. This grouping may be performed by matching service titles for the base level software services or by matching the metric and/or unit type for the metrics. This grouping is repeated for the leaf nodes associated with each of the identified grandparent nodes.

Within each grouping of metrics, the metrics are ordered at 65 based on a current service quality indicator associated with each of the metrics.

Each grouping of metrics forms a chart to be displayed in the report. In the exemplary embodiment, the number of metrics displayed in a chart can be limited to a predefined maximum number (e.g., five). In particular, the performance metrics having the lowest service quality indicators are displayed in the chart.

Since the number of charts that can be displayed on a single interface of the display is also limited, charts are ordered at 66 based upon their impact to the application being monitored. In the exemplary embodiment, charts are ordered by the service quality values of the metrics in a given chart. For example, the chart having the metric with the lowest service quality value (amongst all of the charts) is ordered first, the chart having the metric with the second lowest service quality value is ordered second and so forth. Alternatively, charts may be order based upon a mean of service quality values of the metrics in a given chart. In another example, the charts are ordered based on a current service quality indictor for the service tier (i.e., grandparent node) associated with given chart, or a combination of the service quality indicator for the service tier and the metrics associated with a given chart. Other types of ordering schemes are envisioned by this disclosure. Lastly, the order charts are presented at 67 to the user.

From the operations overview interface shown in FIG. 2, the user may initiate an investigation into a performance problem by selecting an application experiencing a problem. In response to this selection, a unified performance analysis report is generated for the selected application and displayed to the user in the manner described below. The performance analysis report enables a user to assess the source of the problem using a single interface and, if necessary, take further actions to troubleshoot the problem.

Figure 7:
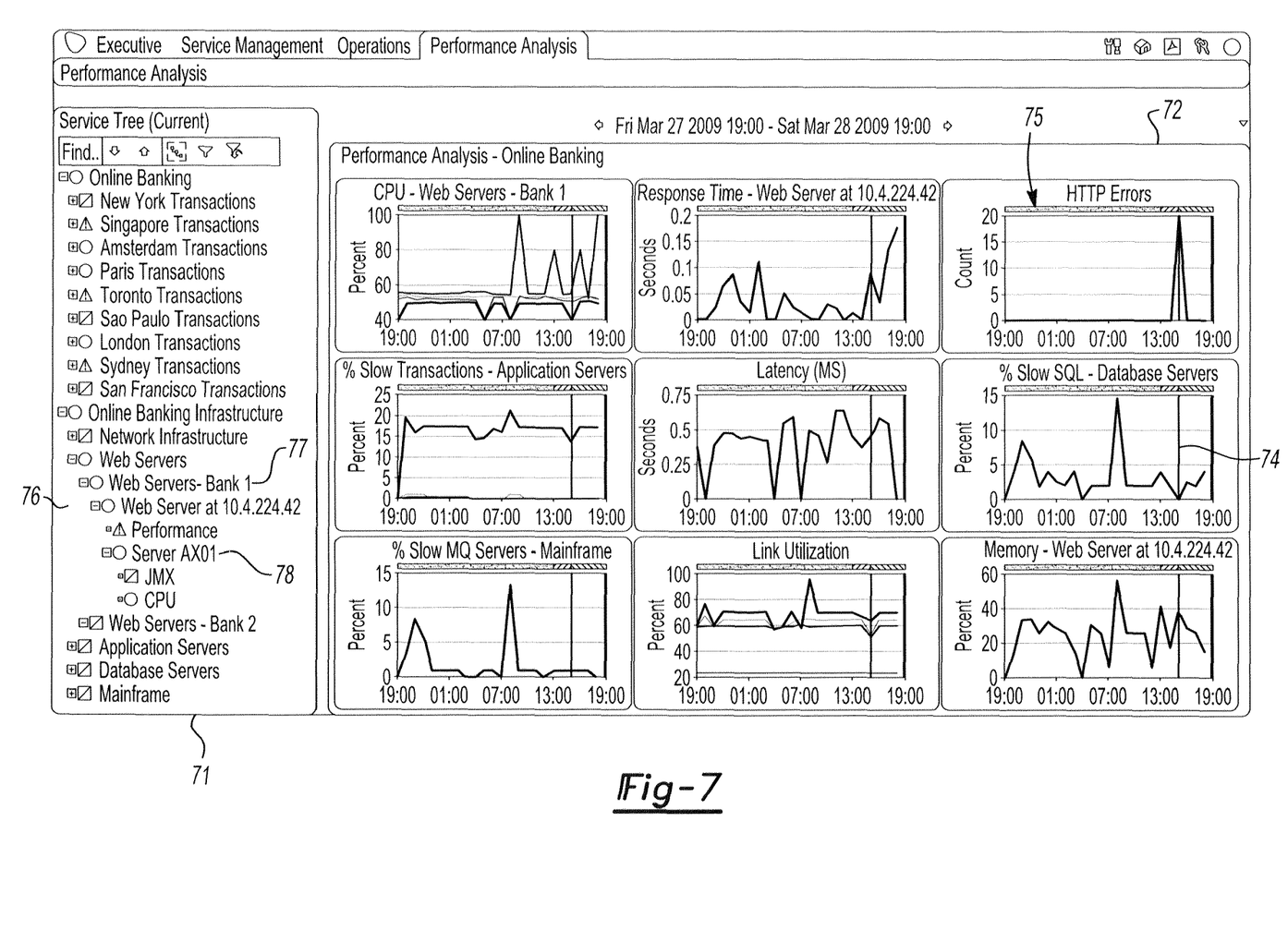
FIG. 7 depicts an exemplary unified performance analysis interface.

FIG. 7 is an exemplary unified performance analysis interface that is generated by a performance management tool in accordance with this disclosure. For illustration purposes, online banking is the application being reported on. The performance analysis interface may be sub-divided into two or more panels outlined by wire frames for easy of viewing. In this exemplary embodiment, the interface is divided into a service tree panel 71 and a line chart panel 72.

The line chart panel displays multiple charts for the selected application of online banking. These charts are generated in accordance with the methodology described above. Some of the exemplary charts include CPU utilization for web servers, response time for web servers, percent of slow transactions for application servers and percent of slow queries for database servers. Further details regarding how these charts can be displayed is provided below.

Each chart plots a group of performance metrics over time (i.e., in relation to a time axis) and preferably shares the same time axis with the other charts. The time period plotted in the charts should include the time at which the change in the application's state of service occurred but is otherwise a user configurable parameter which may span a day, a week, a month or other time increments. The time at which the state of service changed may also be demarcated by a vertical line in the cart as indicated at 74.

Figure 8:
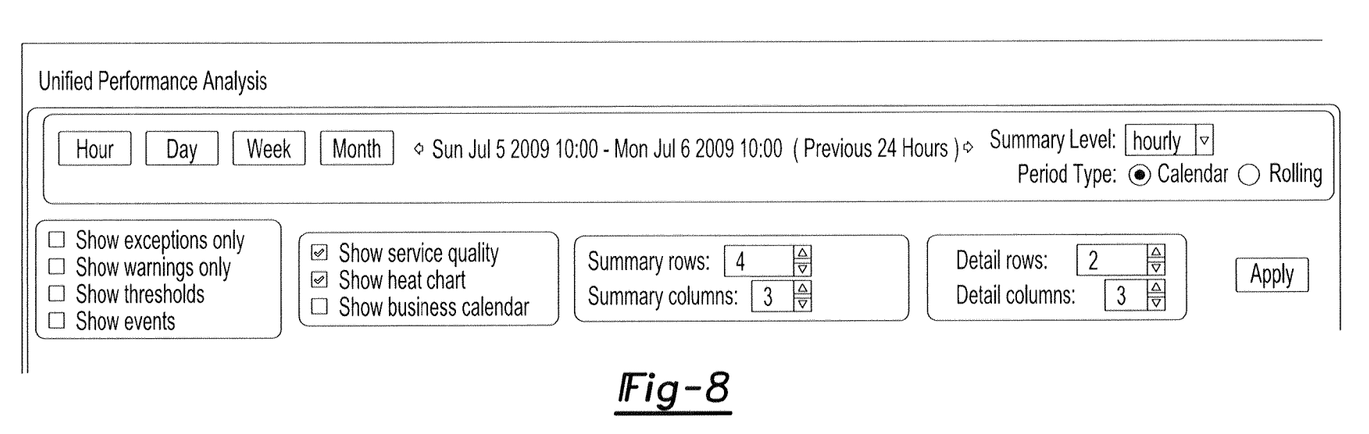
FIG. 8 depicts exemplary user configurable options for the unified performance analysis report.

Several user configurable options are available to the user as shown in FIG. 8. For example, the user can select the time span for the charts as noted above. The user can also select how many rows of charts to display as well as the number of charts to display in each row. Other options include to show only metrics that exceed a threshold in the selected period of time, to show (or hide) an indicator for the threshold value, to show the heat chart described below, or to show a business calendar on each chart. Other user configurable display options are also contemplated by this disclosure.

To help identify the cause of the problem, an indicator for the state of service for the application is also displayed in a heat chart format adjacent to each chart. In an exemplary embodiment, the indicator for an application's service state is a bar 75 that extends along the top edge of each chart. The indicator shows the application's service state at each point in time and is color coded to display a different color for each of the different service states. For example, a normal state of service is color coded green, a warning state of service is color coded yellow and an error or non-operational state of service is color coded red. Other types of indicators are also contemplated by this disclosure. In this way, the indicator for the state of service helps the user to correlate the different metrics to the time period in which the application experienced a problem.

The service tree panel 71 contains a graphical representation of the portion of the service model that is being reported on. In other words, the service tree panel depicts the nodes from the tree structure that are associated with the selected application of online banking. In this case, the application infrastructure node for online banking has children nodes corresponding to network infrastructure, web servers, application servers, database servers and mainframe. These nodes may be further expandable as defined in the service model. For illustration purposes, the web server node 76 is shown expanded in FIG. 7. Thus, the user has the ability to select any of these nodes to view the hierarchy below the node.

Depending upon which node is selected, the user is taken to a summary chart with multiple services shown on each chart or a detailed chart with charts for a single service. If the user selects a group level node (i.e., at least two tiers above a leaf node), the line chart panel will be populated with multiple metric charts for the selected node. The charts may be generated in the manner set forth above. Web servers—Bank 1 node 77 is an example of a group level node. If the user selects a software service node, then a single chart for each of the metrics associated with the software service is displayed. Server AX01 node 78 is an example of a software service node. Alternatively, the user selects an individual metric node and a single line chart for the selected metric is displayed. The service tree panel provides the user with an intuitive way to drill down into different areas of concern. Other types of navigation modes are envisioned by this disclosure.

Figure 9:
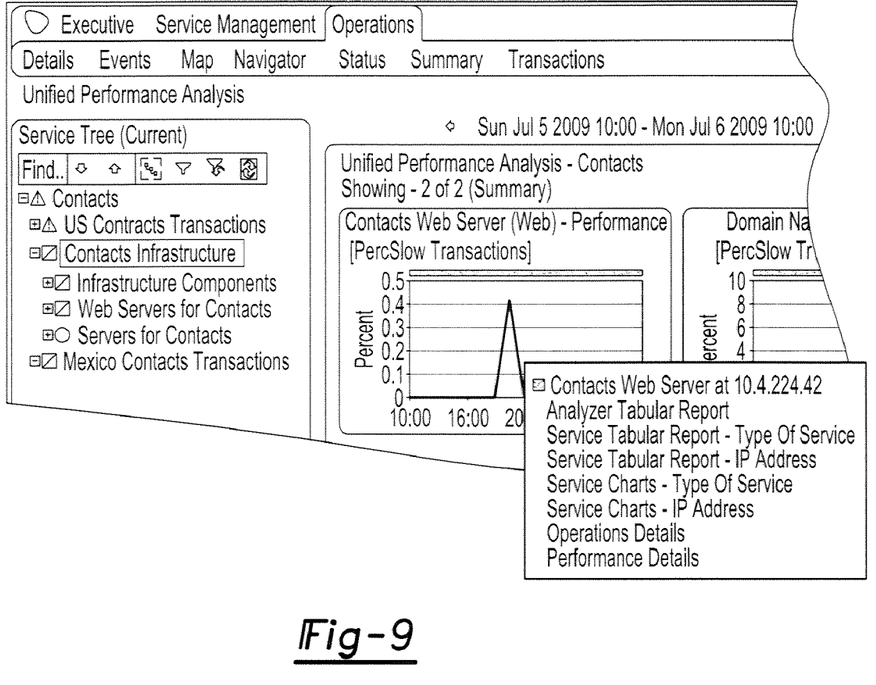
FIG. 9 depicts an exemplary popup menu which may be available on the unified performance analysis report.

To further investigate a problem, another drill down feature may be made available as shown in FIG. 9. By selecting a given chart (e.g., right clicking), a popup menu may present more detailed reporting options. These reporting options will relate specifically to the data that is being displayed. In a summary report, one additional drill down feature is to switch to a detailed chart view for a selected service. Other types of drill down features can be incorporated in the reporting tool.

The unified performance analysis technique present in this disclosure allows the business or operations manager to quickly identify the likely cause of an application performance problem among the multiple possible application tiers (i.e., Web, application, or database tiers), and among the multiple physical devices within those tiers. It does this by only displaying those services and servers that are related to the application, by ordering the metric values based on their impact to the service being monitored, and by showing the quality of the application over time in relation to the metrics over time.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A performance management tool that monitors performance of a software application in a computing environment, comprising:
a service model residing in a data store that maps each software application in the computing environment to respective computing infrastructure that supports the software application, wherein the service model is further defined by a tree data structure having nodes representing software applications which are linked to other nodes that represent software services used by the respective software application;
a service manager embodied as computer executable instructions in a computer memory and executed by a computer processor of a computing device, the service manager is configured to detect a change in a state of service provided by a given software application along with a time at which the change occurred and generate a report, having one or more graphs, for the given software application using the service model, each graph depicts a metric over a period of time and an indicator for the state of service associated with the given software application, where the metric provides a basis for the state of service associated with the given software application, the metric and the indicator are shown in relation to a time axis of the graph, and the time period includes the time at which the change in the state of service occurred.

2. The performance management tool of claim 1 wherein the report further includes a graphical representation for a portion of the service model that corresponds to the given software application.

3. The performance management tool of claim 1 wherein nodes representing the software services have leaf nodes depending therefrom that represent metrics associated to the respective software service.

4. The performance management tool of claim 1 wherein the indicator for the state of service associated with a software application is color coded to display different colors for different states of service.

5. The performance management tool of claim 1 wherein the service manager identifies software services that support the application using the service model, identifies metrics associated with each of the identified software service, and groups the identified metrics into groups of metrics having similar data types, where each group of metrics forms a basis for a graph in the report.

6. The performance management tool of claim 5 wherein a graph includes a line in a corresponding group of metrics and each line correlates to a different software service that supports the application.

7. The performance management tool of claim 5 wherein the service manager orders the graphs based upon the impact of the metrics in a given graph to the application.

8. The performance management tool of claim 1 wherein the report is presented to a user as a graphical user interface on a display device.

9. A method for identifying a cause of a performance problem experienced by an application in a computing environment, comprising:
identifying, by a service manager, software services that support an application experiencing a performance problem, each software service having a service type and one or more performance metrics associated therewith and each performance metric having an associated data type and service quality indicator, wherein the service manager is embodied as computer-executable instructions stored in a non-transitory storage medium and executed by a computer processor of a computing device;
grouping, by the service manager, the identified software services into groups of services having a similar service type;
for each group of services, identifying, by the service manager, performance metrics associated with the software services in the respective group and grouping the identified performance metrics into groups of metrics having a similar data type;
selecting, by the service manager, a subset of groupings from the groups of metrics, where the groupings in the subset have performance metrics with the lowest service quality indicators; and
displaying, by the service manager, a chart for each group of metrics in the subset of groupings on a display device, where each chart plots the performance metrics contained in a respective group of metrics in relation to a time axis of the chart.

10. The method of claim 9 further comprises monitoring a state of service provided by the application over time and displaying an indicator for the state of service adjacent to the performance metrics and in relation to the time axis on each chart.

11. The method of claim 10 further comprises displaying different color coded indicators for different states of service.

12. The method of claim 9 further comprises storing a service model in a data store that maps applications in the computing environment to respective software services that support a given application.

13. The method of claim 12 further comprises displaying a graphical representation for a portion of the service model that corresponds to the application experiencing performance problems, concurrently with the charts on the display device.

14. The method of claim 9 further comprises ordering performance metrics within a given group of metrics by corresponding service quality indicators and displaying a predefined number of the performance metrics having the lowest service quality indicators in the chart for the given group of metrics.

15. A method for identifying a cause of a performance problem experienced by an application in a computing environment, comprising:
    storing a service model having a tree structure with an application root node whose branches define relationship amongst applications in the computing environment and an infrastructure root node whose branches define the computing infrastructure which comprises the computing environment, where each application having a node in the tree structure and a corresponding link node depending therefrom that maps the application to respective software services that supports the application;
    identifying, by a service manager, software services that support an application experiencing a performance problem, each software service having a service type and one or more performance metrics associated therewith and each performance metric having an associated data type and service quality indicator, wherein the service manager is embodied as computer-executable instructions stored in a non-transitory storage medium and executed by a computer processor of a computing device;
    grouping, by the service manager, the identified software services into groups of services having a similar service type;
    for each group of services, identifying, by the service manager, performance metrics associated with the software services in the respective group and grouping the identified performance metrics into groups of metrics having a similar data type; and
    displaying, by the service manager, a chart for each group of metrics on a display device, where each chart plots the performance metrics contained in a respective group of metrics in relation to a time axis of the chart.

16. The method of claim 15 wherein identifying software services that support an application further comprises identifying the link node for the application and retrieving performance metrics associated with the application by scanning branches extending from the link node to the leaf nodes.

17. The method of claim 16 further comprises retrieving a grandparent node for each of the retrieved leaf nodes, where each grandparent node defines a grouping of software services associated with the application.

18. The method of claim 15 further comprises, for each grouping of metrics, ordering metrics based on service quality indicator associated with each of the metrics.

19. The method of claim 15 further comprises ordering charts based service quality indicators of the metrics included in each of the charts.

20. The method of claim 15 further comprises monitoring a state of service provided by the application over time and displaying an indicator for the state of service adjacent to the metrics and in relation to the time axis on each chart.

21. The method of claim 20 further comprises displaying different color coded indicators for different states of service.

22. The method of claim 15 further comprises displaying a graphical representation for a portion of the service model that corresponds to the application experiencing performance problems, concurrently with the charts on the display device.

* * * * *